(12) United States Patent
Keam

(10) Patent No.: US 7,874,496 B2
(45) Date of Patent: Jan. 25, 2011

(54) OPTICALLY READABLE TAG

(75) Inventor: Nigel Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 12/099,162

(22) Filed: Apr. 8, 2008

(65) Prior Publication Data

US 2009/0173796 A1    Jul. 9, 2009

Related U.S. Application Data

(60) Provisional application No. 61/018,934, filed on Jan. 4, 2008.

(51) Int. Cl.
G06K 19/06    (2006.01)

(52) U.S. Cl. ..................................... 235/494

(58) Field of Classification Search ............... 235/494, 235/462.03, 462.08, 462.09, 487
See application file for complete search history.

(56) References Cited

U.S. PATENT DOCUMENTS

| | | | |
|---|---|---|---|
| 4,874,936 A * | 10/1989 | Chandler et al. ............ 235/494 |
| 5,202,552 A * | 4/1993 | Little et al. .................. 235/494 |
| 5,288,986 A * | 2/1994 | Pine et al. .................... 235/494 |
| 5,892,846 A | 4/1999 | Davis |
| 6,116,510 A | 9/2000 | Nishino |
| 6,131,807 A * | 10/2000 | Fukuda et al. ............... 235/494 |
| 6,149,059 A | 11/2000 | Ackley |
| 6,321,986 B1 | 11/2001 | Ackley |
| 6,601,772 B1 * | 8/2003 | Rubin et al. ................ 235/494 |
| 6,706,314 B2 | 3/2004 | Butland |
| 6,843,420 B2 * | 1/2005 | Paul et al. ................... 235/487 |
| 6,873,687 B2 | 3/2005 | Smith |
| 7,139,099 B2 | 11/2006 | Hashizume et al. |
| 7,150,400 B2 | 12/2006 | Melick et al. |
| 7,510,125 B2 * | 3/2009 | Look ........................... 235/494 |
| 7,661,601 B2 * | 2/2010 | Takano et al. ............... 235/494 |
| 2004/0182930 A1 | 9/2004 | Nojiri |
| 2005/0017082 A1 | 1/2005 | Moran et al. |
| 2006/0092205 A1 * | 5/2006 | Jackson Pulver et al. ....... 347/13 |
| 2007/0145141 A1 * | 6/2007 | Ayatsuka ................. 235/462.1 |
| 2007/0152059 A1 | 7/2007 | Nadabar |

(Continued)

FOREIGN PATENT DOCUMENTS

JP    05019694 A    1/1993

(Continued)

OTHER PUBLICATIONS van Gils, "Two-Dimensional Dot Codes for Product Identification", IEEE Transactions on Information Theory, Sep. 1987, vol. 33, No. 5, pp. 620-631.

(Continued)

Primary Examiner—Michael G Lee
Assistant Examiner—Suezu Ellis
(74) Attorney, Agent, or Firm—Alleman Hall McCoy Russell & Tuttle LLP

(57) ABSTRACT

Embodiments related to the identification of objects via optically readable tags. One embodiment includes an optically readable tag having a data region comprising a two-dimensional array of optically contrasting data features, one or more orientation features located on the tag outside of the data region, and a tracking feature located outside of the data region and having a larger size than the orientation features and the data features.

15 Claims, 5 Drawing Sheets

U.S. PATENT DOCUMENTS

2007/0152060 A1* 7/2007 Kiliccote ............... 235/462.09
2008/0251584 A1* 10/2008 Keam ......................... 235/454
2009/0200384 A1* 8/2009 Masalkar .................... 235/494

FOREIGN PATENT DOCUMENTS

JP 2004259302 A 9/2004
WO WO 2005106769 A2 * 11/2005

OTHER PUBLICATIONS

"Machine-readable Identification Holds the Key to Manufacturing Efficiency", Feb. 2007, Entrepreneur.com, Inc., pp. 1-3.
"Barcode ActiveX—2D Barcode Datamatrix by Wolf Software 1.5", Transit Network, 2001-2007, pp. 2.
ISA Korea, International Search Report of PCT/US2008/085278, Jun. 29, 2009, 3 pages.

* cited by examiner

OPTICALLY READABLE TAG

CROSS-REFERENCE TO RELATED APPLICATIONS

The present application claims priority to U.S. Provisional Application No. 61/018,934, entitled "OPTICALLY READABLE TAG", filed Jan. 4, 2008, the entire contents of which are incorporated herein by reference.

BACKGROUND

Optically readable tags encode data in an optically readable format. Some optically readable tags, such as bar codes, are considered to be one-dimensional in that the tags encode information in a format that can be read via a scan along one direction. Other tags are considered to be two-dimensional in that the tags encode information along two directions. In either case, such tags may be used to identify objects on which the tags are located.

The bit depth of an optically readable tag determines how much data can be encoded on the tag. Generally, the bit depth of a tag is proportional to a number of individual data features, such as individual lines of a bar code, located on the tag. Therefore, a tag with sufficient bit depth for uniquely identifying individual objects within a large set of objects either may have a relatively large size, or relatively small data features that are difficult to track optically via a machine vision system when the tag is in motion.

SUMMARY

Various embodiments related to the identification of objects via optically readable tags are disclosed herein. For example, one disclosed embodiment comprises an optically readable tag having a data region comprising a two-dimensional array of optically contrasting data features, one or more orientation features located on the tag outside of the data region, and a tracking feature located outside of the data region and having a larger size than the orientation features and the data features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
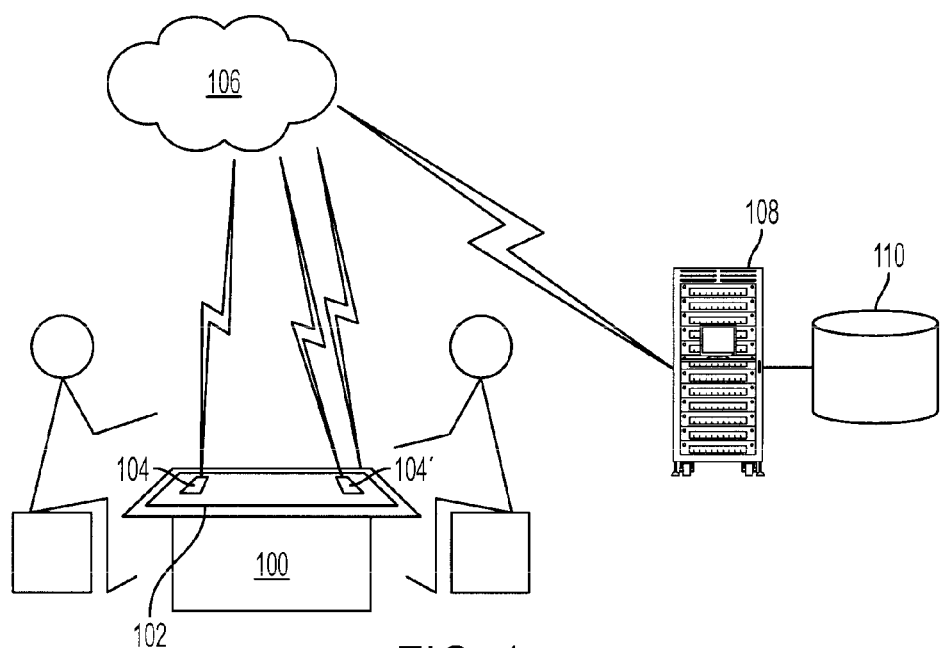
FIG. 1 shows an embodiment of an example use environment for an optically readable tag.

Various embodiments of optically readable tags are disclosed herein that have sufficient bit depths to identify very large numbers of items, and that can be easily tracked when in motion. Prior to discussing the embodiments of optically readable tags disclosed herein, an example of a use environment for an optically readable tag is described. FIG. 1 shows an embodiment of an interactive display device 100 configured to optically read tags associated with one or more objects 104, 104' resting on a display surface 102 of the device. The interactive display device 100 may also be configured to identify the objects and/or the owners of the objects by the value of the tag. The interactive display device 100 is further configured to display items of data associated with each object on the display in a location associated with the corresponding object. Further, as the user moves an object across the display surface 102, the interactive display device 100 is configured to track the motion of the device by optically tracking the tag, and may further be configured to move the displayed items of data across the display surface in a corresponding manner. In this manner, images displayed on the interactive display device 100 may be moved to track the motion of objects 104, 104'.

Data that may be associated with an object on the interactive display device 100 includes, but is not limited to, photographic data, video data, music and other audio data, graphical data, documents, spreadsheets, presentations, and any other suitable type of data. For example, in some embodiments, the interactive display device 100 may be configured to automatically download photographic data from a device placed on its surface (for example, where the objects 104, 104' are digital cameras or cell phones) via a wireless network 106, and then to display the downloaded photographs adjacent to the camera or cell phone from which they were downloaded. Movement of the camera or cell phone to another location on the display surface 102 may cause the photographs to follow the movement of the camera or cell phone across the display surface 102. Likewise, changes in the orientation of the camera or cell phone may be tracked, and may cause the photographs to change orientation in a similar manner.

In other embodiments, the interactive display device 100 may be configured to read the tag associated with an object, and then to download data associated with that object from a remote server 108 or a database 110. As a specific example, a card having an optically readable tag may be issued to and linked specifically to a guest at a resort, amusement park, or other such entertainment facility. While the user is at the entertainment facility, photographs may be taken of the guest performing various activities, such as riding rides, participating in sports activities, etc. These photographs may be displayed to the user at a kiosk for selection after the activity has concluded.

Upon conclusion of the ride, a person may view the photographs at a kiosk, use a tag reader at the kiosk to register the identity of the person making the selection, and then select photographs in which the rider and/or the rider's friends and/or family appear. Then, at a later time and/or different location, for example, in a hotel lobby, a restaurant affiliated with the resort, etc., the rider may place the card on the surface of the interactive display device 100. The device may determine the identity of the holder of the card by optically reading the tag on the card, may query a database to determine those photos previously selected by the rider, and then download those photographs for display on the display surface 102 in a location associated with the card. The photographs may then be moved on the display surface 102 by moving or rotating the card. It will be appreciated that this is only one example of a suitable use environment, and that the interactive display device 100 may be used in any other suitable use environment.

It will be appreciated that, with sufficient tag bit depth, a sufficiently large number of uniquely-valued tags may be produced such that each camera, cell phone, credit card, driver's license, and/or any other desired object may be uniquely identified by a tag. In this case, referring to the resort example above, a user may use a tagged credit card, license, cell phone, or any other tagged object to alert a kiosk of the user's identity, instead of a resort-issued card. The user then may use the same tagged object, or any other tagged object associated with that user, to later download content. Embodiments of tags with sixteen or more eight-bit data bytes that provide for the assignment of approximately $2^{128}$ ($10^{38}$) or more unique identifications are described in more detail below.

Figure 2:
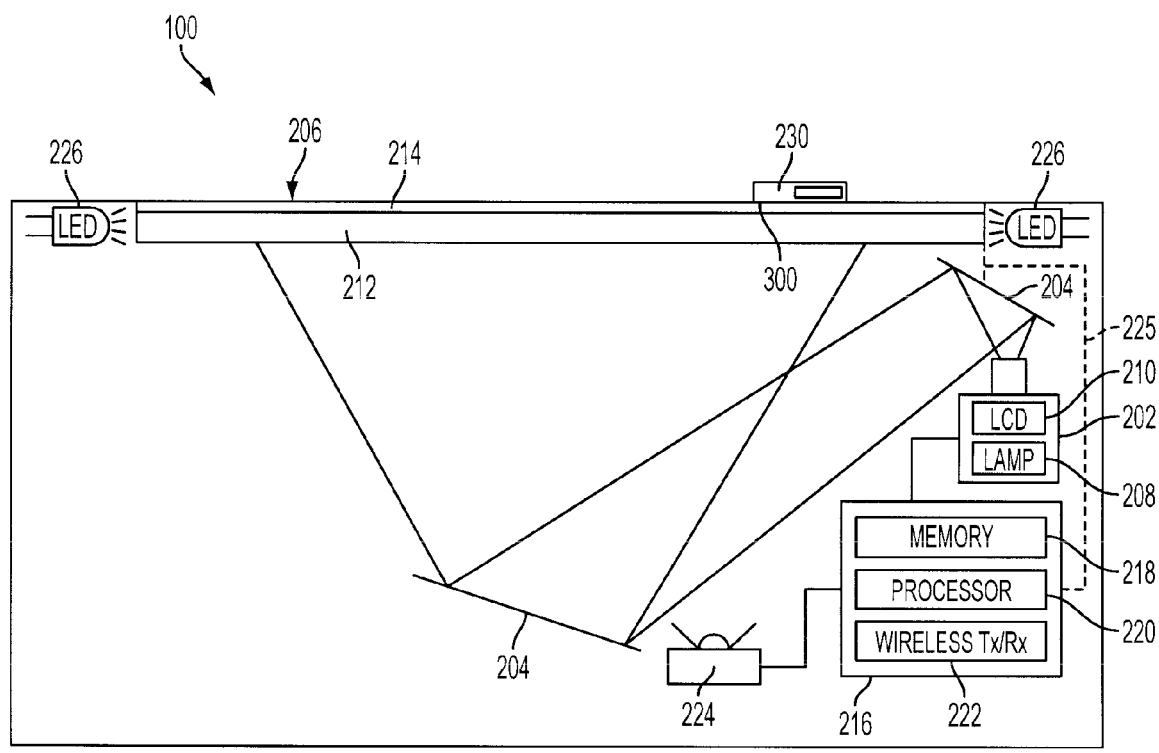
FIG. 2 shows a block diagram of the embodiment of FIG. 1.

FIG. 2 shows a schematic depiction of the interactive display device 100. The interactive display device 100 comprises a projection display system having an image source 202, optionally one or more mirrors 204 for increasing an optical path length and image size of the projection display, and a display screen 206 onto which images are projected. While shown in the context of a projection display system, it will be understood that an interactive display device may comprise any other suitable image display system, including but not limited to liquid crystal display panel systems.

The image source 202 includes an optical or light source 208 such as the depicted lamp, an LED array, or other suitable light source. The image source 202 also includes an image-producing element 210 such as the depicted LCD (liquid crystal display), an LCOS (liquid crystal on silicon) display, a DLP (digital light processing) display, or any other suitable image-producing element. The display screen 206 includes a clear, transparent portion 212, such as sheet of glass, and a diffuser screen layer 214 disposed on top of the clear, transparent portion 212. In some embodiments, an additional transparent layer (not shown) may be disposed over the diffuser screen layer 214 to provide a smooth look and feel to the display screen.

Continuing with FIG. 2, the interactive display device 100 further includes an electronic controller 216 comprising memory 218 and a microprocessor 220. Further, the controller 216 may include a wireless transmitter and receiver 222 configured to communicate with other devices. The controller 216 may include computer-executable instructions or code, such as programs, stored in memory 218 or on other computer-readable storage media and executed by microprocessor 220, that control the various embodiments of tag tracking methods described in more detail below. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

To sense objects and optical tags located on the display screen 206, the interactive display device 100 includes one or more image capture devices 224 configured to capture an image of the entire backside of the display screen 206, and to provide the image to the electronic controller 216 for the detection of tags and objects appearing in the image. The diffuser screen layer 214 helps to avoid the imaging of objects that are not in contact with or positioned within a few millimeters of the display screen 206, and therefore helps to ensure that only objects that are touching the display screen 206 are detected by the image capture device 224.

The image capture device 224 may include any suitable image sensing mechanism. Examples of suitable image sensing mechanisms include but are not limited to CCD and CMOS image sensors. Further, the image sensing mechanisms may capture images of the display screen 206 at a sufficient frequency or frame rate to detect motion of an object across the display screen 206. In other embodiments, a scanning laser may be used in combination with a suitable photodetector to acquire images of the display screen 206.

The image capture device 224 may be configured to detect reflected or emitted energy of any suitable wavelength, including but not limited to infrared and visible wavelengths. To assist in detecting objects and tags placed on the display screen 206, the image capture device 224 may further include an additional light source 226 such as one or more light emitting diodes (LEDs) configured to produce infrared or visible light. Light from the light source 226 may be reflected by objects placed on the display screen 206 and then detected by the image capture device 224. The use of infrared LEDs as opposed to visible LEDs may help to avoid washing out the appearance of projected images on the display screen 206.

FIG. 2 also depicts a device 230, such as a cell phone or camera, that has been placed on the display screen 206. The device 230 includes an optically readable tag 300 which may be read by the optical detector 224 and the controller 216. The value of the tag 300 as determined by the controller 216 may then be used to identify the tagged device 230 and/or an owner of the tagged device by querying a database over a network. Then, data associated with that device and/or owner may be displayed on the display screen 206 in a location associated with the device 230. Further, as described below, the optical detector 224 and the controller 216 may be configured to track the motion and orientation of the tag 300 across the surface of the display screen 206, as described in more detail below.

Figure 3:
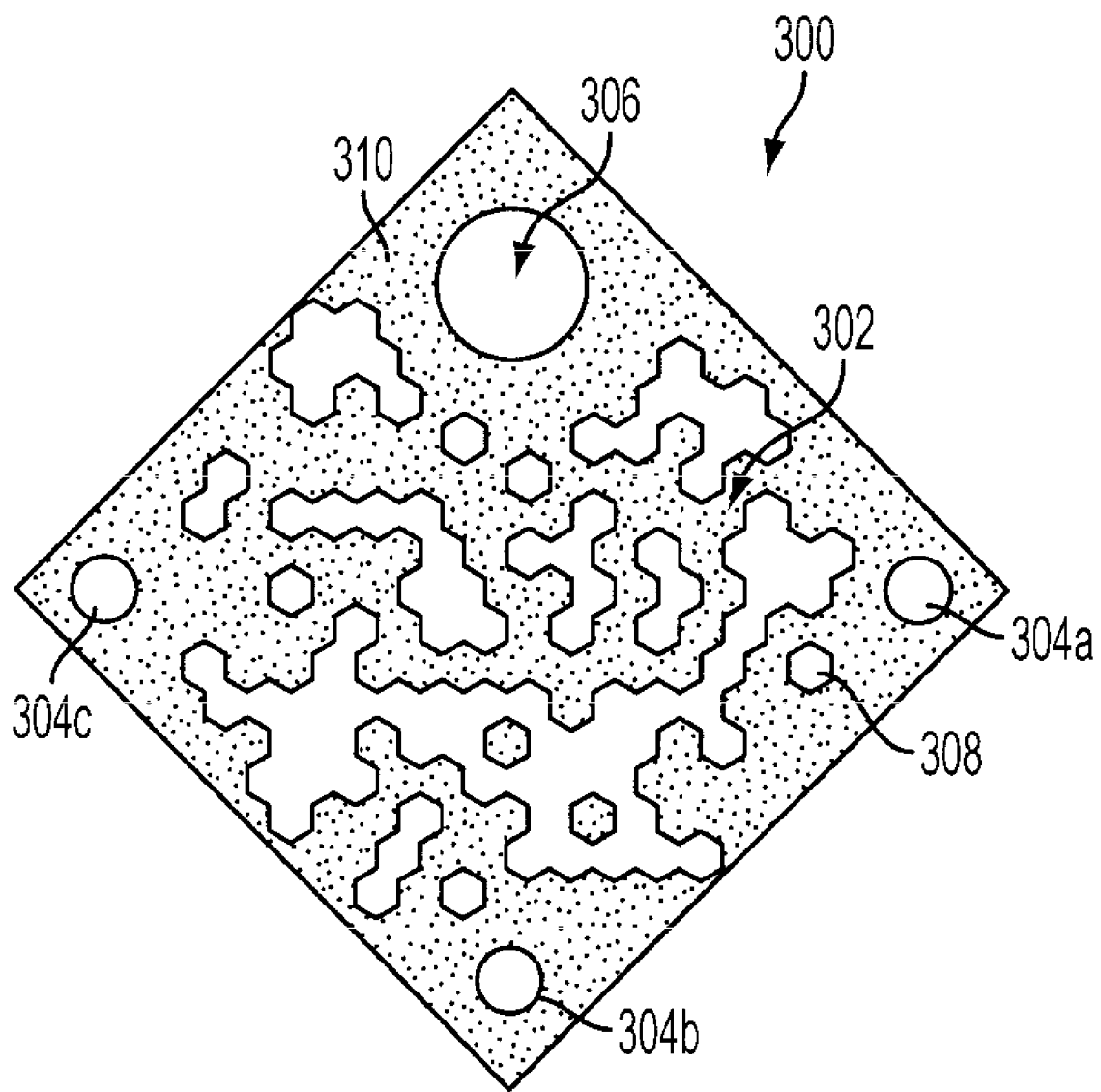
FIG. 3 shows an embodiment of an optically readable tag.
Figure 4:
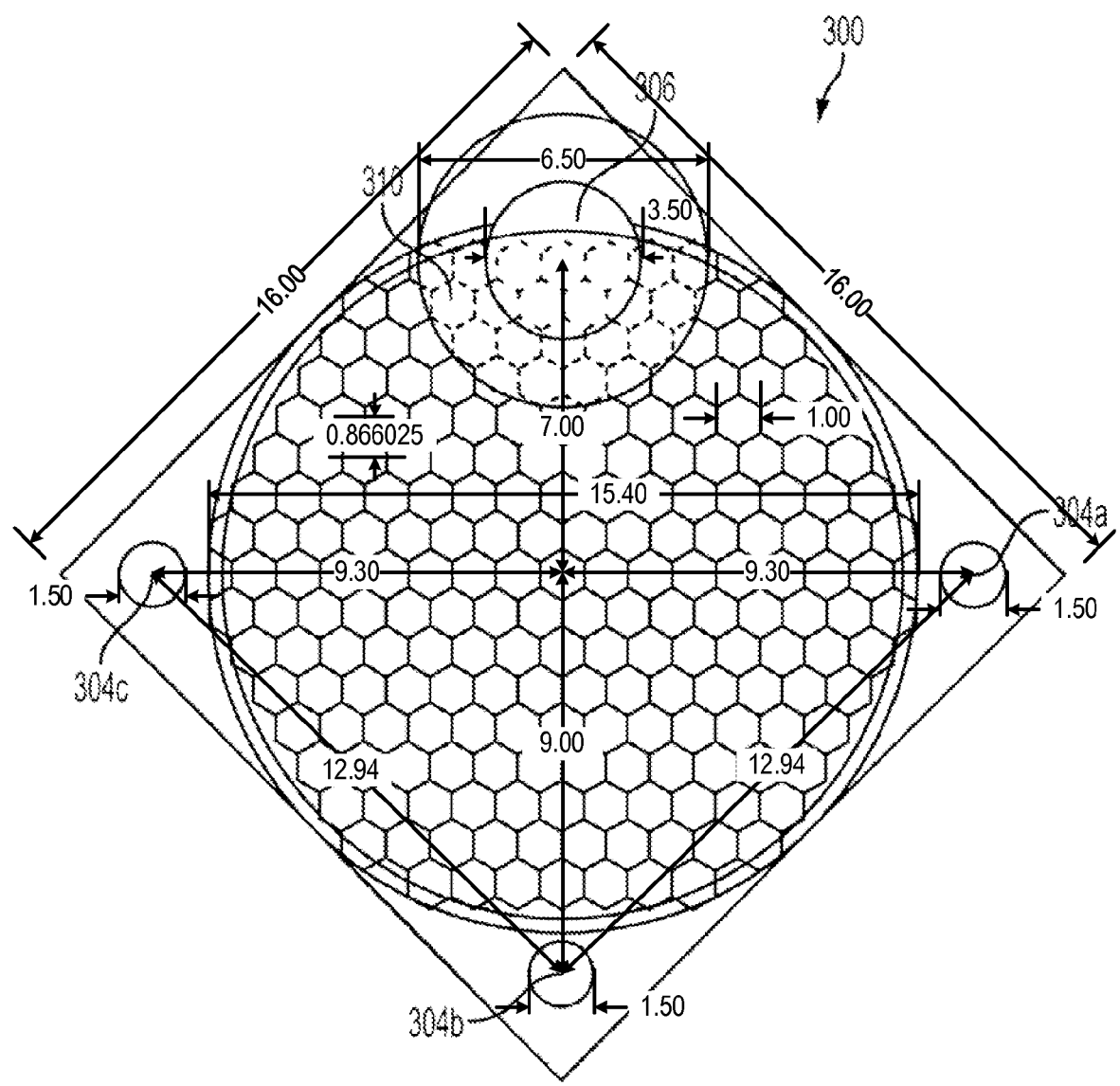
FIG. 4 shows a detailed view of the tag of FIG. 3.

FIG. 3 shows an embodiment of the tag 300 in more detail, and FIG. 4 shows a schematic diagram of the tag 300. The example dimensions shown in FIG. 4 are in units of 1/16 inch, but it will be understood that the tag may have any other suitable dimensions. The tag 300 is a two-dimensional tag in that data is encoded in two orthogonal directions on the tag 300. The tag 300 comprises a data region 302 having a plurality of high resolution data features 308, a plurality of orientation features 304a, 304b and 304c, and a lower resolution tracking feature 306 having a larger size than the data features 308 and the orientation features 304a-c.

In the depicted embodiment, each data feature 308 in the data region 302 takes the form of a small, hexagonal shaped region having one of two optically contrasting appearances (for example, black or white). The hexagonal shape of the data features 308 allow the data features 308 to be packed into the data region 302 in a close-packed arrangement (i.e. without any interstitial space between the data features). Further, the hexagonal shape of the data features 308 may offer a relatively larger data feature area/perimeter ratio than the use of other shapes that can be close-packed, such as triangles, squares, etc., and therefore may facilitate the reading of the data features 308 relative to other shapes.

It will be understood that the term "optically contrasting" as used herein represents any appearances capable of being optically distinguished by a machine vision system, and may apply to any desired wavelength. The data features 302, the orientation features 304a-c, and the tracking feature 306 may be configured to be optically contrasting in any suitable manner. For example, where the light source 226 is configured to emit infrared light, the data features 308 may be formed via black/white printing that give the features a black/white appearance at desired wavelength, including but not limited to infrared wavelengths. In such embodiments, the optical contrast may be detectable at visible wavelengths, or only at non-visible wavelengths. More specifically, a tag may be configured to be readable at infrared wavelengths but substantially transparent at visible wavelengths.

In yet other embodiments, the data features are printed in other visibly optically distinguishable colors than black and white. It will be appreciated that the data features 308 may be printed or formed in any other suitable manner (for example, transparent or obscured manners) to achieve any other desired appearance or visual effect. Further, it will be understood that the tag 300 may be printed on a sheet that is affixed to another object after manufacture, may be printed directly on an object during manufacturing of the object, or may be provided in any other suitable manner.

The orientation features 304a-c as depicted takes the form of a somewhat larger circular feature located outside of the data region 302 (i.e. the orientation features are not interspersed with the data features) adjacent to the corners of the tag 300. The orientation features 304a-c allow the orientation of a tag to be determined before the tag is read. Further, the orientation features 304a-c may be read and used by the controller 216 to determine an orientation in which to display data associated with the tag 300. For example, the controller 216 may display photographs downloaded from a tagged item in an orientation on the display screen 206 determined by the tag orientation.

While the depicted orientation features 304a-c have generally circular shapes, it will be appreciated that the data features 308 and the orientation features 304a-c may have any other suitable shape or shapes, including but not limited to various rounded and/or polygonal shapes. Further, any suitable number of orientation features may be used, and the orientation features 304a-c may have any other suitable location(s) on the tag other than that shown. For example, in some embodiments, a tag may have a single orientation feature on the face of the tag that may be used in combination with a border of the tag, or a location of a data region or tracking feature of the tag to determine the tag orientation. Additionally, while the depicted orientation features 304a-c have a lower resolution (i.e. larger size) than the data features 308, it will be understood that the orientation features may have any suitable resolution. It will be understood that the terms "adjacent to the corners", "at the corners" and the like may be used herein to describe the location of the orientation features 304a-c, and that these terms refer to areas of the tag 300 bordered by the outer perimeter of the data region 302 and the outside edges of the tag. Because the data region 302 extends to the side of the tag 300 at the middle of each side of the tag 300, the corner areas are separated from one another by the data region, and the three orientation features 304a-c and the tracking feature 306 each occupy one corner region of the tag 300.

In order to increase bit depth for a given tag size, the density of the data features 308 may be increased by decreasing the size of the data features to a value close to a minimum size that is readable by the optical detector 224 while the tag 300 is stationary (or moving very slowly). For example, with the depicted tag configuration, bit depths on the order of eighteen 8-bit data bytes encoded in 8B10B format or other suitable format, plus 9 error checking bits (for example, cyclic redundancy checking (CRC) bits), may be achieved with a one-inch square tag 300. This bit depth may allow for a sufficiently large number of different valued tags to exist such that each tagged object may have a globally unique identification. It will be appreciated that the minimum data feature size that is readable may depend upon the optical characteristics of the optical system used to read the tag, including but not limited to the resolution of the image sensor, the modulation transfer function of the lens, blurring effects caused by the diffuser layer 214 in the display screen 206, etc.

The use of small data features 308 may increase the difficulty of tracking the tag 300 while the tag 300 is in motion on the display screen 206. For example, small data features 308 may appear blurred in an image captured of the tag 300 in motion, and therefore may be difficult or impossible to read accurately. The effect of the blur for a given feature is based at least partially upon the size of the feature being observed relative to the distance the tag moves in the time period during which the image is acquired (i.e. the "integration time" for the sensor). Where the size of the data features 308 are close to the minimum size that can be read due to the constraints of the optical components, little motion of the tag may be tolerated without blur reducing the clarity of the image beyond a point at which the data features 308 cannot be read.

If a tag is moved on the display screen 206 to the extent that an image of the tag cannot be matched with certainty to a tag in an immediately prior image by reading the tag, the interactive display device 100 may not move images or other displayed data associated with the tag until the tag can again be positively read. This may cause motion of the images to freeze on the screen as the interactive display device 100 waits for the motion of tag 300 to slow sufficiently for reading.

Therefore, the tracking feature 306 facilitates the tracking of the tag 300 when in motion. The tracking feature 306 is configured to have a sufficiently low resolution compared to the data features 308 such that blurring due to motion has less of an effect on the reading of the tracking feature 306, and such that the tracking feature in a most recently acquired image overlaps the same tracking feature in the immediately prior image, or is sufficiently close to the same tracking feature in the immediately prior image, to allow the tracking features in two sequential images to be determined to be the same, even when the tag is moved at a relatively fast speed. It will be appreciated that the nature of this determination may depend upon the particular characteristics of the image capture system used to acquire the images of the tag. For example, where the integration time is the same as the period of frames (i.e. where the camera starts integrating a new frame as soon as the integration of the prior frame is complete), then the image acquisition may be sufficiently fast to detect overlap between images of a tracking feature in sequential images. If, however, there is a gap between integration periods, then the image of a trackable feature between two frames may not overlap, even though the tracking feature is distinguishable in both frames. In this case, a threshold distance for center-to-center maximum distance between tracking features in sequential frames, for example, may be used for determining if they are the same tracking feature.

The depicted tracking feature 306 comprises a continuous region having an optically contrasting appearance compared to a border or border region 310 surrounding the tracking feature 206. The depicted tracking feature 306 has a generally circular shape, but may alternatively have any other suitable shape, including but not limited to other rounded shapes, polygonal shapes, and/or combinations thereof. The use of a round shape may offer the advantage of utilizing less space on the tag 300 than other shapes for a given minimum dimension.

To enable the tracking feature 306 to be tracked more easily than the data features 308 when in motion, the tracking feature has a minimum dimension greater than a maximum dimension of each data feature. In the specific example of the depicted circular tracking feature 306, the minimum diameter of the tracking feature 306 is greater than a maximum width of each hexagonal data feature 308. Likewise, the border region 310 also has a minimum width separating the tracking feature 306 from a closest feature (either a data feature 308 or orientation feature 304) that is greater than a maximum width of each data feature 308. In FIG. 4, the outlines of some data features are shown in dashed lines in the border region 310. However, these outlines are included only to more clearly indicate the generally round outer perimeter of the data region 302, and not to imply that any data features are contained within the border region 310. Instead, the perimeter of the data region 302 comprises an indentation (shown by the slid line outer perimeter of the data features 308) that accommodates the tracking feature and border region.

The combination of the widths of the tracking feature 306 and the border region 310 allows the tracking feature 306 to be tracked in any direction of movement more easily than any of the data features 308 can be tracked. For example, as the tag 300 is moved across the display screen 206, the larger size of the tracking feature 306 compared to each data feature 308 allows the tracking feature 306 to overlap itself (or be sufficiently close that it can be assumed it is the same tracking feature) in sequential images at rates of tag movement too great to allow any data feature 308 to overlap itself in sequential images. Further, the width of the border region 310 prevents the tracking feature 306 from overlapping with any data features 308 in sequential images. In this manner, once the tag 300 has been initially read, motion of the tag 300 may be positively tracked across the display screen 206 by following the path of the tracking feature 306 across the display screen 206. This may allow the interactive display device 100 to the track tag 300 with certainty, and therefore to move associated items of data on the display screen 206 without lag, under ordinary use conditions.

The tracking feature 306 and the border region 310 may have any suitable shapes, sizes and/or dimensions. Suitable shapes and sizes may depend to some degree upon the intended use environment for the tag 300. For example, in the use environment described above in the context of FIGS. 1 and 2, examples of suitable sizes for the tracking feature include, but are not limited to, tracking features with minimum dimensions greater than 2× the maximum dimension of the data features. Likewise, examples of suitable sizes for the border regions around the tracking feature include, but are not limited to, borders providing a minimum separation between the tracking feature and nearest data or orientation feature of 1.5× the maximum dimension of the data features.

In one specific embodiment, the one-inch square tag 300 comprises hexagonal data features 308 with an edge-to-edge width of $1/16$ inch, a circular tracking feature 306 with a diameter of $3.5/16$ inch (i.e. 3.5× the size of data features 308) and a border region 310 having a width of $6/16$ inch to $6.5/16$ inch. If it is assumed that the $1/16$" data feature size is the minimum size that can be imaged when tag 300 is at rest, the extra $2.5/16$ inch diameter of the tracking feature 306 may be used for blur compensation. With an imaging system running at 60 frames/second with 100% integration time (i.e. 16.6 ms), the $3.5/16$ inch tracking feature 306 may be tracked at a speed of up to $(2.5/16$ inch$)/(1/60$ sec$)=9.375$ inches/second. It will be appreciated that the dimensional ranges and specific dimensions described above are provided for the purpose of example, and are not intended to be limiting in any sense.

The tracking feature 306 may have any suitable location on the tag 300, including central locations (i.e. close to the center of the tag) and locations adjacent to one or more edges of the tag. In the depicted embodiment, the tracking feature 306 is disposed outside of the data region 302 and adjacent to a corner of the tag 300 other than those corners occupied by the orientation features 304a-c. In this location, no data features are located between tracking feature 306 and a nearest edge of the tag 300. This may allow tracking feature 306 to displace fewer data features 308 than if the tracking feature 306 were located centrally on tag 300. Likewise, the orientation features 304a-c are depicted as each being located adjacent to a different corner of the tag 300. This placement may avoid the orientation features 304a-c from displacing the data features 308. In alternative embodiments, a tracking feature and/or one or more orientation features may be more centrally located on a tag. In a central location, the tracking feature may allow the center of the tag to be accurately located while tracking at higher speeds, even where the orientation is lost.

Figure 5:
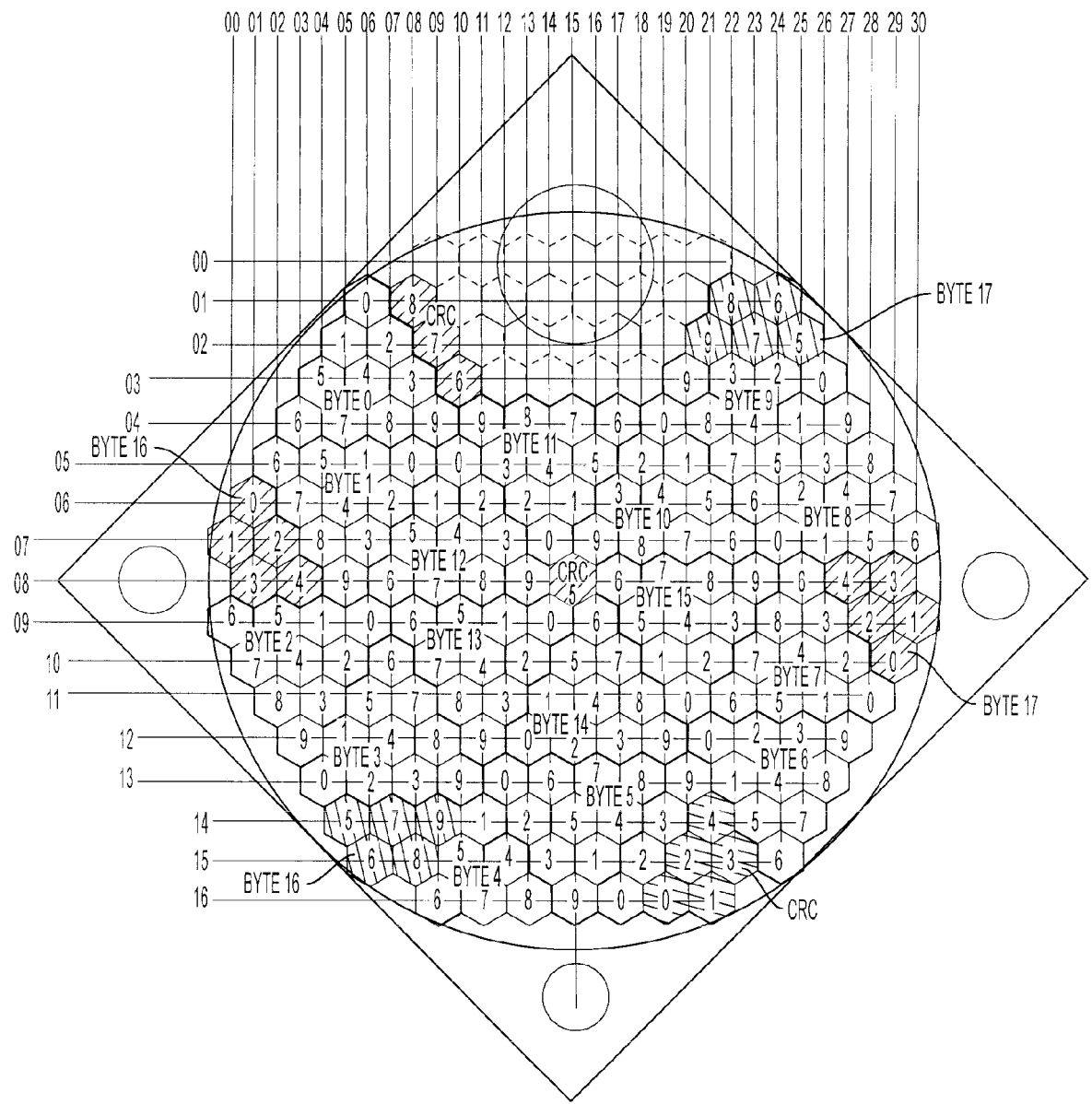
FIG. 5 shows a schematic depiction of an embodiment of a bit layout of the tag of FIG. 3.

The orientation features 304 and the tracking features 306 may be used to determine the location and orientation of the tag 300 prior to reading the data region 302. Once the location and the orientation of the tag 300 are determined, the value of the tag 300 may be read. FIG. 5 shows an example embodiment of a bit layout for the tag 300. In the depicted embodiment, the data region 302 comprises a total of one hundred eighty nine optically contrasting data features that each represents one of a first value and a second value, and that fall within a circle having a diameter extending the width of the tag 300. In the depicted embodiment, the data features 308 are arranged in seventeen rows and thirty one columns, as shown by the reference grid overlying the figure. This is a sufficient number of data features to encode eighteen eight-bit data bytes using 8B10B encoding and also to include nine directly recorded error checking bits.

Continuing with FIG. 5, sixteen primary data bytes, shown as bytes 0-15 in FIG. 5, are recorded using an encoding scheme such as 8B10B encoding. Where 8B10B encoding is used, each data byte comprises ten data features 302 that encode eight data bits. The use of 8B10B encoding allows the data region 302 to maintain a 50:50 average first value-to-second value ratio, and therefore allows the avoidance of all-black or all-white values (in a tag that uses a black/white color system) that may be difficult to read. It will be understood that 8B10B encoding is described for the purpose of example, and that any other suitable coding scheme in which a lesser number of data bits is encoded via a greater number of optically readable data features may be used to help balance the ratio of the contrasting colors used in data region 302.

Further, areas within data region 302 that are shown in dark in FIG. 5 comprise two additional 8B10B-encoded (or similarly-encoded) data bytes (bytes 16 and 17) that may be used to represent a two-byte context value, and nine directly-recorded (as opposed to 8B10B encoded) error checking bits, shown by the label "CRC". Bytes 16, 17, and the error-checking bits each may comprise any suitable combination of the data features 302 shown in dark in FIG. 5 other than that shown.

In one embodiment, bytes 0-15 are used to represent a globally unique ID for the tag, bytes 16-17 are used to represent a two-byte context value, and the nine error-checking bits are used to perform a CRC process. The combination of the CRC and the 8B10B encoding of the 18 data bytes helps to reduce the chances of a misread of a tag. In other embodiments, either more or fewer than 16 bytes may be used to represent a globally unique ID, and either more or fewer than 2 bytes may be used to represent a context value. Likewise, either more or fewer than 9 bits may be used as error checking bits. In yet other embodiments, the data bytes may be directly recorded, or may be encoded in another format than 8B10B.

Bytes 16 and 17 (as well as any other data bytes used to represent a context value) may represent any suitable information related to context. For example, these bytes may represent a context that provides a schema for data bytes 0-15. As a specific example, in one embodiment, the context bytes may encode information that signifies that some portion of data bytes 0-15 encode information related to a marketing partner. Upon reading this information in the context bytes, a device reading the tag may then read data bytes 0-15 to determine more information about the partner (for example, an identity of the partner), as well as information regarding the significance of the values of the other data bytes in the specific context of the partner.

As another specific example, the context bytes may encode information indicating that the tagged device is enabled to communicate wirelessly with the device reading the tag. In this case, some portion of bytes 0-15 may be used to indicate a machine address of the tagged device for communication. In other embodiments, the context bytes may indicate that information on the tagged device can be found at a look-up service. One context byte value may represent a specific look-up service with a known address, while another context byte value may indicate that the address of the look-up service is encoded in some portion of bytes 0-15.

As another specific example, the context bytes may encode information indicating that a text message is encoded in some portion of bytes 0-15. Upon reading the context bytes, the reading device may then interpret the content of the relevant portion of bytes 0-15 as, for example, an ASCII message.

In other embodiments, the context bytes may encode substantive information, rather than information regarding a schema in which to analyze bytes 0-15 (as in the above-described examples). In this case, one context bit may indicate whether any specific substantive information is encoded in the other context bits, and the other context bits may encode the actual information. As a specific example, in one embodiment, one bit of the sixteen 8B10B-decoded context bits may indicate that the other fifteen bits directly encode the identity of a partner entity. In this case, the partner identity can be determined by reading the other fifteen context bits, rather than by reading some portion of bytes 0-15. It will be understood that the specific examples described herein are included for the purpose of illustration, and are not intended to be limiting in any sense. Further, it will be understood that bytes 16-17 may be used for any other suitable purpose than encoding a tag context.

Figure 6:
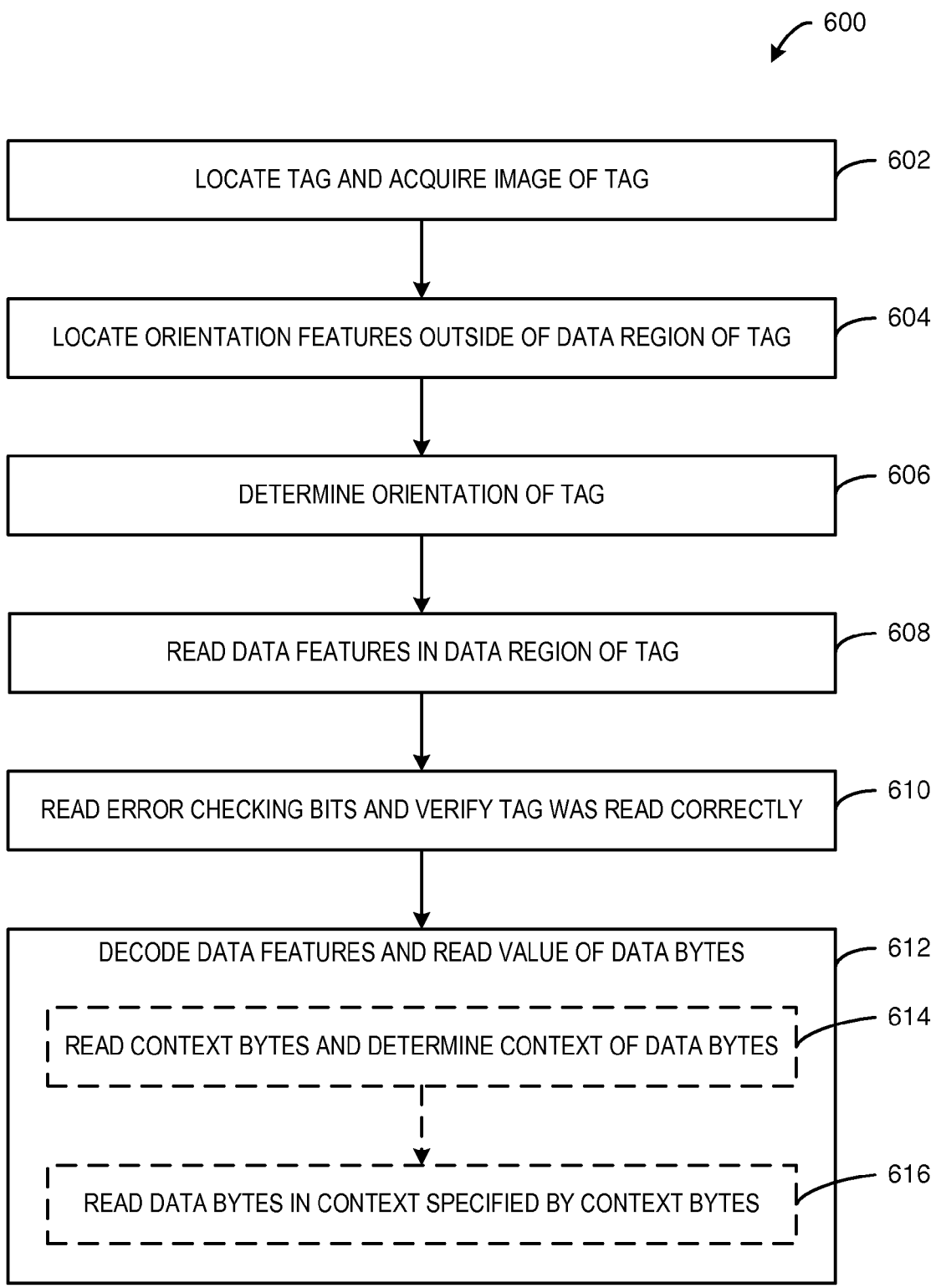
FIG. 6 shows a process flow of an embodiment of a method of reading an optically readable tag.

FIG. 6 shows an embodiment of a method of reading an optically readable tag such as tag 300. First, method 600 comprises, at 602, locating the tag and acquiring an image of the tag. Next, method 600 comprises, at 604, locating orientation features on the tag that are disposed outside of a data region of the tag. In the specific example of tag 300, this may comprise detecting the orientation features 304a-c at the corners of the tag 300, and also may comprise detecting the tracking feature 306. In other embodiments, this may comprise reading any other suitable number and/or arrangement of orientation features.

Next, method 600 comprises, at 606, determining the orientation of the tag from the relative locations of the orientation features. Then, at 608, method 600 comprises reading the data features within the data region of the tag, and then, at 610, reading error checking bits on the tag to verify that the tag was read correctly. In the specific example of tag 300, this may comprise reading nine directly recorded cyclic redundancy checking bits within the data region of the tag. In other embodiments, any suitable number of error checking bits may be used. If the tag was not read correctly, processes 602-610 may be performed until a correct reading of the tag is made. In some embodiments, the data features may have a close-packed arrangement such that no interstitial space exists between data features, while in other embodiments, one or more individual data features may be separated by a suitable amount of space.

After it is verified that a correct reading of the tag has been made, method 600 next comprises, at 612, decoding the data features read from the data region of the tag to determine the value of the data bytes encoded by the tag. In the specific example of tag 300, decoding the data features may comprise decoding the 8B10B-encoded data features to determine the value of the data bytes encoded by the tag. In some embodiments, all data bytes may be used to encode an identification number for the tag. In such embodiments, the machine that reads the tag (for example, interactive display system 100) may be configured to read the tag in a specific context. For example, the machine that reads the tag may be configured to contact a preselected lookup service upon reading the tag to identify a tagged object, to automatically read a text message encoded in the tag, etc.

In other embodiments, the machine that reads the tag may be configured to read one or more data bytes encoded in the tag data region as context bytes, as indicated at 614, and then to read the remaining data bytes in the context specified by the context bytes, as indicated at 616. For example, the tag may comprise a context byte that specifies that the other data bytes (or a subset of the other data bytes) encodes a wireless network address for communicating with the tagged object. In this manner, the machine reading the tag may first read the context byte or bytes, then read the wireless network address of the tagged object from the other data bytes, and then initiate wireless communication with the tagged object at the specified address. This may allow, for example, the interactive display device 100 to download photographs, audio/video content, etc. from a tagged object such as a camera, cell phone, etc., and display the content to a user automatically, without any user input (other than any desired authentication or other security measures).

It will be used that the above-described use of context bytes is described for the purpose of example, and that the context bytes may encode any other suitable context information. Examples of other suitable contexts for data bytes that may be specified by one or more context bytes include, but are not limited to, partner identity information (or other partner information), a lookup service address, and a text message. For example, where the context byte or bytes signifies that one or more data bytes contain a lookup service address, the machine reading the tag may first read the lookup service address from the data bytes, and then may contact the lookup service to obtain information about the tagged device. In yet other embodiments, the context bytes may encode substantive information, as described above.

The various embodiments disclosed herein comprise combinations of features that provide sufficient bit depth to assign globally unique identifications to very large sets of items via reliably-readable tags on the order of one-inch or smaller in size. It will be understood that the specific bit layout shown in FIG. 5 is disclosed for the purpose of example, and is not intended to be limiting in any sense, as any other suitable layout of bits may be used.

It will further be appreciated that the configurations and/or approaches described herein are exemplary in nature, and that these specific embodiments or examples are not to be considered in a limiting sense, because numerous variations are possible. The specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optically readable tag, comprising:
 a data region comprising a two-dimensional array of hexagonally shaped data features, the data features having one of two optically contrasting values, the data features comprising:
  a plurality of primary data bytes, the primary data bytes comprising a greater number of data features encoding a lesser number of data bits within the data region so that there is a 50:50 ratio of a first optically contrasting value to a second optically contrasting value, and
  a plurality of directly recorded error checking bits;
 one or more orientation features located on the tag outside of the data region; and
 a tracking feature located outside of the data region and having a larger size than the orientation features and the data features.

2. The optically readable tag of claim 1, wherein the data region has a generally round outer perimeter with a diameter of one inch or less.

3. The optically readable tag of claim 2, wherein the perimeter of the data region comprises an indentation to accommodate the tracking feature.

4. The optically readable tag of claim 1, wherein the data features are arranged in a close-packed arrangement within the data region.

5. The optically readable tag of claim 1, wherein the tag comprises a sufficient number of data features to encode at least sixteen eight-bit data bytes.

6. The optically readable tag of claim 5, wherein the tag comprises a sufficient number of data features to encode eighteen eight-bit data bytes via 8B10B encoding and one or more directly recorded error checking bits.

7. The optically readable tag of claim 1, wherein the tag comprises three orientation features each located at a different corner of the tag, and wherein the tracking feature is located at a corner of the tag other than the corners occupied by the orientation features.

8. An optically readable tag, comprising:
 a data region comprising a two-dimensional array of a plurality of hexagonally shaped, optically contrasting data features within a single, continuous perimeter, the data features encoding a plurality of data bits such that a greater number of data features encode a lesser number of data bits, the data bits having a 50:50 ratio of a first optically contrasting value to a second optically contrasting value, the data features arranged in a close-packed arrangement so that there is no interstitial space between the data features within the data region;
 three orientation features disposed at different corners of the tag outside of the data region; and
 a tracking feature disposed outside of the data region and having a larger size than the orientation features and the data features.

9. The optically readable tag of claim 8, wherein the tracking feature is disposed at a corner of the tag.

10. The optically readable tag of claim 8, wherein the tag comprises a sufficient number of data features to encode eighteen eight-bit data bytes and also comprise a plurality of directly recorded cyclic redundancy error checking bits.

11. An optically readable tag, comprising:
 a data region, the data region comprising at least one hundred eighty nine hexagonally shaped, optically contrasting data features within a single, continuous perimeter, the data features arranged in a close-packed arrangement so that there is no interstitial space between the data features within the data region, each data feature representing one of a first value or a second value, a first portion of the data features being arranged to form at least sixteen primary data bytes within the data region, each primary data byte comprising ten contiguous data features that encode eight data bits, a second portion of the data features exclusive of the first portion of the data features being arranged to form at least two context data bytes, each context data byte comprising ten data features divided into at least two discontiguous context data byte regions, the ten data features of each context data byte encoding eight data bits;
 three circular orientation features located outside of the data region and separated from one another by the data region, each circular orientation feature occupying separate corner regions of the tag and each circular orientation feature being larger than any individual data feature; and
 a single circular tracking feature separated from the data region by a border region, the border region having a minimum width that exceeds a maximum width of any data feature, the single circular tracking feature occupying a corner region of the tag that is not occupied by a circular orientation feature.

12. The optically readable tag of claim 11, wherein the primary data bytes and the context data bytes are encoded with an 8B10B encoding scheme.

13. The optically readable tag of claim 12, wherein the data region lies within a circle having a diameter being equal to a width of the tag.

14. The optically readable tag of claim 13, wherein the data features are further arranged in seventeen rows and thirty one columns.

15. The optically readable tag of claim 14, wherein the data region further comprises at least nine directly recorded error checking bits, at least one directly recorded error checking bit being located at an approximate center of the data region.

* * * * *